Oct. 29, 1935.  A. S. HOWELL  2,019,261
INTERMITTENT FEED MECHANISM
Filed June 22, 1933  3 Sheets-Sheet 1
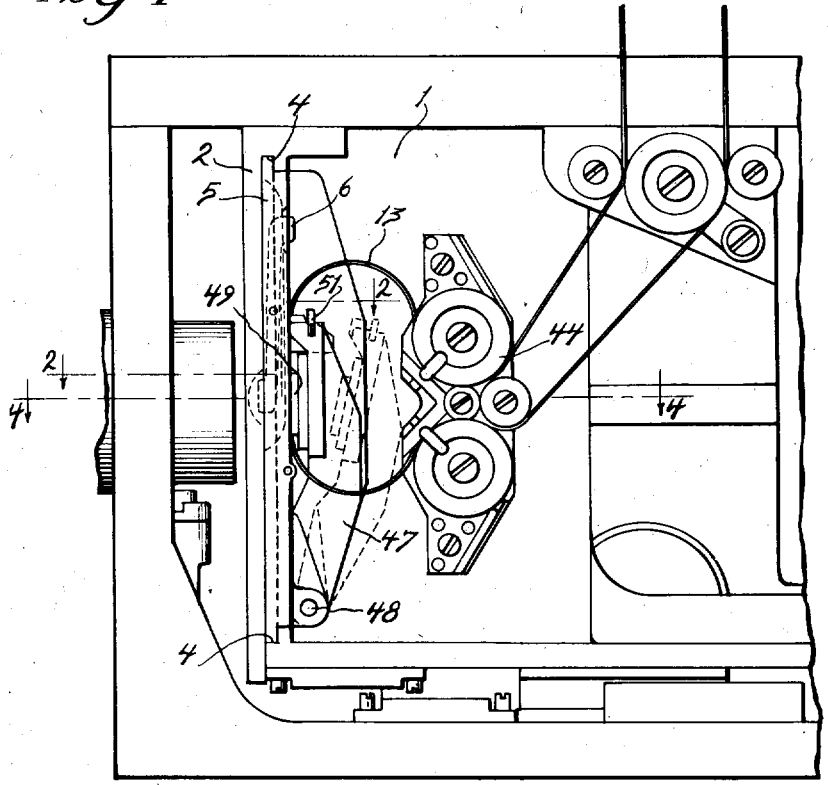
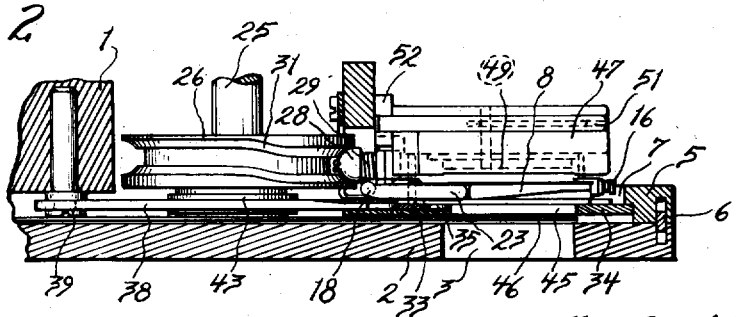
Inventor.
Albert S. Howell

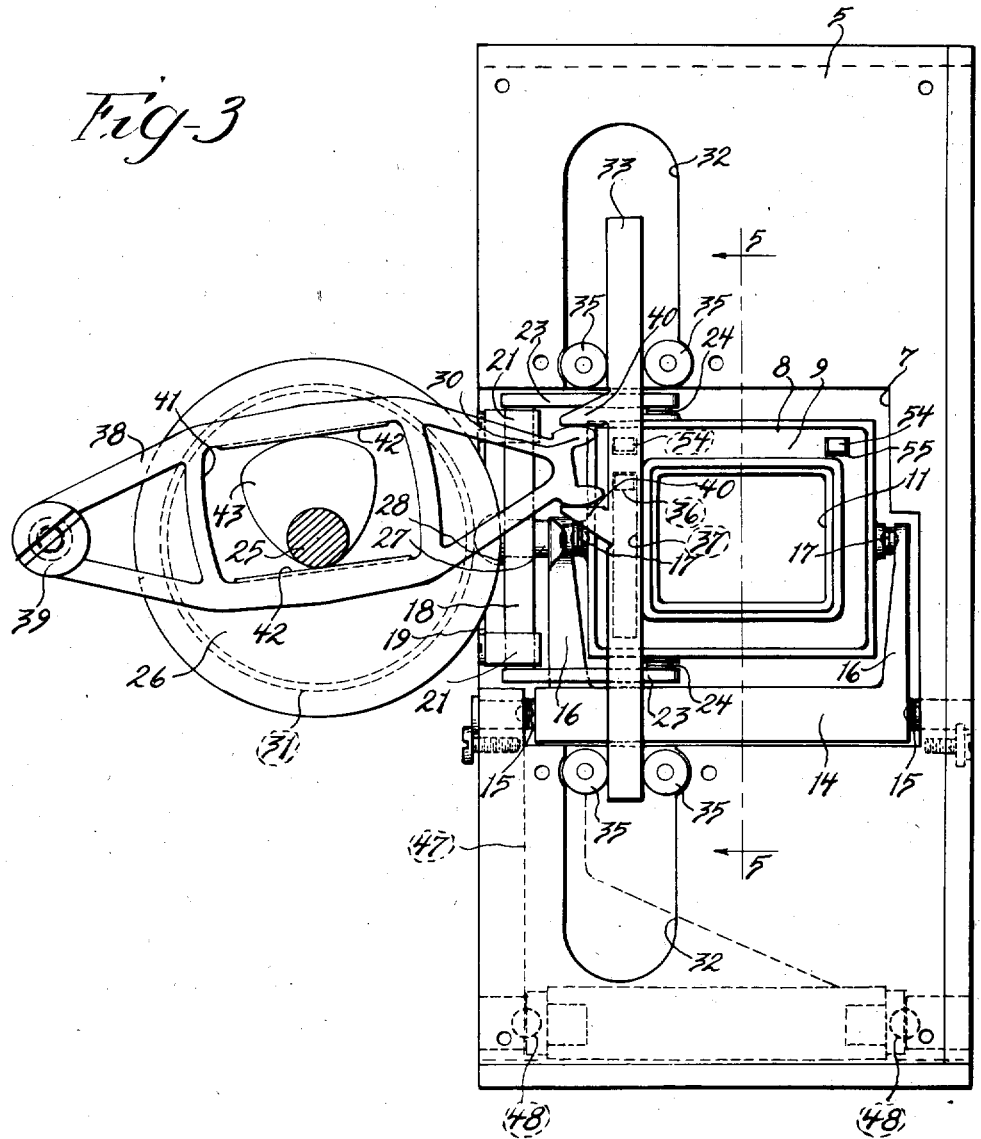

Oct. 29, 1935.  A. S. HOWELL  2,019,261
INTERMITTENT FEED MECHANISM
Filed June 22, 1933  3 Sheets-Sheet 3
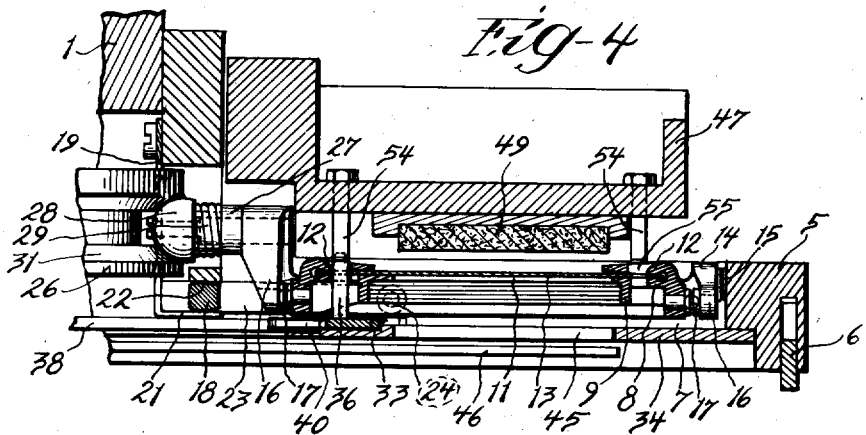
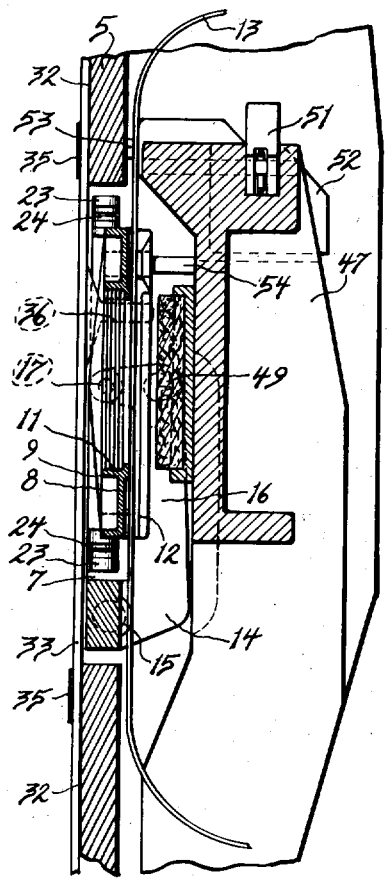
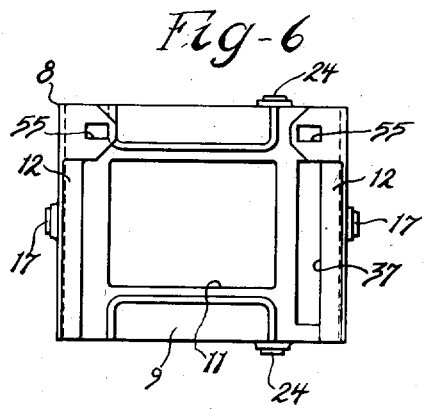
Inventor:
Albert S. Howell
By Robert F. Michle
Atty.

Patented Oct. 29, 1935

2,019,261

UNITED STATES PATENT OFFICE 2,019,261

INTERMITTENT FEED MECHANISM

Albert S. Howell, Chicago, Ill., assignor to The Bell & Howell Company, Chicago, Ill., a corporation of Illinois Application June 22, 1933, Serial No. 677,035

9 Claims. (Cl. 88—18.4)

My invention relates particularly to intermittent feed mechanism for progressively exposing motion picture film strips in motion picture cameras, although not limited to this use alone.

The general object of the invention resides in the provision of a novel and effective intermittent feed mechanism which is particularly adapted for motion picture cameras, all with a view toward convenience and precision in operation.

With this object in view my invention consists in certain features of novelty in the construction, combination and arrangement of parts by which the said object and certain other objects, hereinafter appearing, are effected, all as fully described with reference to the accompanying drawings and more particularly pointed out in the appended claims.

In the said drawings—

Figure 1 is a partial interior view in side elevation of a motion picture camera embodying my invention;

Figure 2 is a partial section taken substantially on the line 2—2 of Figure 1;

Figure 3 is a partial interior view in front elevation;

Figure 4 is a partial section taken substantially on the line 4—4 of Figure 1;

Figure 5 is a partial section taken substantially on the line 5—5 of Figure 3; and Figure 6 is a rear face view of the film guide of the mechanism.

Like characters of reference indicate like parts in the several views.

Referring to the drawings, 1 designates a main frame of the camera mechanism which is provided with a laterally extending vertical portion 2 at the front of the film chamber of the camera and apertured, as designated at 3, on the focal axis of the camera. See Figures 1 and 2.

This laterally extending portion 2 is provided at its rear face with vertically spaced opposing laterally extending parallel slides 4 in which upper and lower ends of a second frame 5 are slidably engaged for the removable mounting of the frame in the camera, the frame 5 being releasably secured in its mounted position, relative to the portion 2, by a releasable latch device generally indicated at 6 in Figure 1.

The main portion of the frame 5 is disposed similarly with the portion 2 of the main frame and is provided with an intermediate opening 7 embracing the focal axis of the camera. See Figures 3 to 5.

Associated with the opening 7 and disposed correspondingly with the plane thereof, is a vertical film guide 8 comprising a main or front face portion 9 provided with an exposure aperture 11, and vertically extending rear guide portions 12 at the vertical side edge portions of the guide and formed integrally therewith to provide channels for the guidance of a film 13 through the guide, the guide portions being spaced from each other whereby the center portion of the rear face portion of the guides is open throughout its length for the insertion and removal of a film by curving the film on a longitudinal axis to engage and disengage the film with the side channels of the guide. See Figures 4, 5 and 6.

A rocker lever 14 is pivotally mounted on the frame 5 in the lower portion of the opening 7 below the guide 8 by means of opposing bearings 15 disposed on an axis extending correspondingly with the plane of the guide 8 and transverse to the movement of the film in the guide, and comprises a pair of spaced correspondingly extending arms 16 extending adjacent opposite side edges of the guide and pivotally connected therewith on a common axis by means of bearings 17. See Figure 3.

A second rocker lever 18 is pivotally mounted on the frame 5 in the inside portion of the opening 7 at the inside of the guide 8 by means of a spring clip 19 secured to the frame 5 and provided with vertically spaced spring portions 21 engaging and rearwardly urging the main portion of the rocker lever 18 against a vertical transverse forwardly facing surface 22 of the frame 5. See Figures 3 and 4.

The rocker lever 18 is thus mounted for pivotal movement on an axis extending correspondingly with the plane of the guide 8 and longitudinally of the movement of the film in the guide, and comprises a pair of spaced correspondingly extending arms 23 extending adjacent opposite end edges of the guide and pivotally connected therewith on a common axis by means of bearings 24.

The pivotal axes of the rocker levers 14 and 18 are thus disposed at a right angle, and the guide is mounted by means of these rocker levers for facewise movement. The slight arcuate movement of the guide on the pivotal axis of one rocker lever with reference to the other rocker lever is accommodated by the slippage of the rocker lever 18 upon the bearing surface 22.

Disposed at the inside of the frame 5 and rotatably mounted on the frame 1 on a horizontal axis normal to the plane of the guide 8, is a revoluble shaft 25 which carries a cam member 55

26 in fixed relation therewith. See Figures 2 and 3.

The inner arm 16 of the rocker lever 14 carries an inwardly projecting stud 27 at its upper or free end, and a roller 28 of part spherical form is mounted on the inner end of the stud 27 for rotation and limited axial movement. A compression spring 29 on the stud yieldably urges the roller 28 inwardly into engagement with an axial cam groove 31 of corresponding part spherical form on the cam member 26, so that the guide 8 is reciprocated facewise with rotation of the cam member.

The front face of the frame 5 is provided with alined vertically extending recesses 32 above and below the opening 7 and disposed in the region of the inner side portion of the guide 8. See Figures 2, 3 and 4. A vertically extending shuttle bar 33 extends across the opening 7 and into the recesses 32 and is mounted for vertical reciprocation longitudinally of the guide 8 by means of its rear face slidably engaging the bottom of the recesses 32 and its front face slidably engaging the rear face of a plate 34 secured on the front face of the frame 5 and laterally spaced pairs of rollers 35 above and below the opening 7 and rotatably mounted on the frame 5 and engaging opposite sides of the shuttle bar.

The shutter bar is disposed in front of the guide 8 and is alined with the usual marginal longitudinally spaced perforations of the film 13 in the guide, and is provided with a rearwardly projecting feed pin 36 adapted to project through a vertically elongated opening 37 in the front face portion of the guide 8 to engage the aforesaid perforations of the film in the guide for feeding the same.

A laterally extending cam actuated lever 38 is pivotally mounted at one end, as designated at 39, see Figures 2 and 3, on an axis disposed parallel to that of the cam member 26 and disposed on the side of the cam member opposite that on which the frame 5 and the guide 8 and shuttle bar 33 are disposed. The lever 38 is provided at its intermediate portion with an opening 41 providing vertically spaced opposing parallel surfaces 42 oppositely engaging a radial cam 43 on the cam member 26 for oscillating the lever 38 with rotation of the cam member.

The other end of the lever 38 is provided with a bearing formation 30 which is engaged for sliding and pivotal movement between two vertically spaced laterally projecting lugs 40 on the intermediate portion of the shuttle bar 33 to reciprocate the shuttle bar with rotation of the cam member 26 in timed relation with facewise reciprocation of the guide 8 as effected by the cam groove 31.

The timing of the cam groove 31 and the cam 43 is such that the guide 8 is positioned forwardly to engage the feed pin 36 of the shuttle bar 33 with a perforation of the film in the guide during movement of the shuttle bar in one direction and the guide 8 is positioned rearwardly to disengage the feed pin 36 from the film during movement of the shuttle bar in the opposite direction, thus providing an intermittent feed of the film in the guide.

It is to be observed that the roller 28 is engageable and disengageable with the cam groove 26 and the shuttle bar 33 is engageable and disengageable with the lever 38 with lateral movement of the frame 5 in the slides 4, so that the frame 5 and the parts may be conveniently installed in and removed from the camera.

The film 13 is fed to and from the guide 8 by means of a constant film feeding mechanism, generally indicated at 44, and disposed in the camera to the rear of the frame 5 and driven in timed relation with the cam member 26 by mechanism unnecessary to be described. See Figure 1.

The plate 34 is provided with an aperture 45 alined with the exposure aperture 11 of the guide 8 and a usual segmental light shutter 46 is fixed on the shaft 25 and operates in a plane in front of the plate 34 to intermittently cut off the exposure light from the film in the guide in timed relation with the intermittent feeding of the film in the guide as is usual for the photographing of motion pictures.

A film face engaging member 47 is disposed at the rear of the frame 5 and is pivotally mounted at its lower end, as designated at 48, on the lower end of the frame 5 on a horizontal axis extending correspondingly with the plane of the guide 8. See Figures 1 and 3.

The upper end of the member 47 is thus movable forwardly and rearwardly relative to the frame 5 and guide 8, and the upper end of the member 47 is provided with a forwardly facing film face engaging structure 49 alined with the exposure aperture 11 of the guide and engageable with a film in the guide through the aforesaid central opening in the rear of the guide.

The member 47 is releasably secured in its forward position by means of a releasable spring latch lever 51 on the upper end of the member 47 and engaging a slotted block 52 on the frame 5 to maintain a stop 53 on the upper end of the member 47 forwardly engaged against the frame 5. See Figures 2 and 5.

In the forward position of the member 47, the front face of the film face engaging structure 49 is disposed to be engaged by the rear face of the film in the guide at the exposure aperture 11 when the guide 8 is in its rearward position to provide a support for the film at the exposure aperture during exposure, the film being exposed when the guide is in its rearward position.

By releasing the latch lever 51 from the block 52 the member 47 may be positioned rearwardly, as shown in broken lines in Figure 1, so that the film may be conveniently inserted in and removed from the guide.

Mounted on the upper end of the member 47 is a pair of forwardly projecting laterally spaced stationary pilot pins 54 which are adapted to project through apertures 55 in the film guide and engage perforations of a film in the guide in alternation with the feed pin 36 as the guide 8 is facewise reciprocated, see Figures 3, 4 and 5, the arrangement being such that in the forward position of the guide, the feed pin 36 is engaged with the film to intermittently feed the same and in the rearward or exposure position of the guide, the pilot pins 54 are engaged with the film to register the film during its rest or exposure period.

Having thus described my invention, I do not wish to be limited to the precise details described as changes may be readily made without departing from the spirit of my invention, but having thus described my invention, I claim as new and desire to secure by Letters Patent the following:

1. In a device of the character described the combination of a rearwardly open film guide having its front face portion provided with an exposure aperture, means for intermittently feeding a perforated film in said guide including means for facewise reciprocating said guide, a film face engaging member at the rear of a film in said guide and adapted for engagement by the film at said exposure aperture in the rearward position of said guide, and means for positioning said film face engaging member in a forward film engaging position and adapted to permit the movement thereof rearwardly out of said position.

2. In a device of the character described the combination of a film guide having its front face portion provided with an exposure aperture and having the center portion of its rear face portion open throughout its length, means for intermittently feeding a perforated film in said guide including a reciprocating film feed shuttle in front of said guide and provided with a rearwardly projecting feed pin and means for facewise reciprocating said guide in timed relation with reciprocation of said shuttle, a film face engaging member at the rear of the film in said guide and adapted for engagement by the film at said exposure aperture in the rearward position of said guide, means for positioning said film face engaging member in a forward film engaging position and adapted to permit the movement thereof rearwardly for removal and insertion of the film, and at least one stationary pilot pin on said film face engaging member engageable with perforations of the film in alternation with said feed pin as the film is intermittently fed.

3. In a device of the character described the combination of a frame member provided with an opening, a rearwardly open film guide associated with said opening and disposed correspondingly with the plane thereof and having its front face provided with an exposure aperture, means on said frame member and associated with said opening thereof for carrying said guide for facewise movement, means for intermittently feeding a perforated film in said guide including a feed shuttle extending across said frame opening in front of said guide and mounted on said frame on opposite sides of said frame opening for reciprocating movement and means for facewise reciprocating said guide in timed relation with reciprocation of said shuttle, a film face engaging member at the rear of a film in said guide and adapted for engagement by the film at said exposure aperture in the rearward position of said guide and mounted for movement rearwardly of said film engaging position, and means for releasably positioning said film engaging member in its film engaging position.

4. In a device of the character described the combination of a frame member provided with an opening, a film guide associated with said opening and disposed correspondingly with the plane thereof and having its front face provided with an exposure aperture and having the center portion of its rear face portion open throughout its length, means on said frame member and associated with said opening thereof for carrying said guide for facewise movement, means for intermittently feeding a perforated film in said guide including a feed shuttle extending across said frame opening in front of said guide and mounted on said frame on opposite sides of said frame opening for reciprocating movement and provided with a rearwardly projecting feed pin and means for facewise reciprocating said guide in timed relation with reciprocation of said shuttle, a film face engaging member at the rear of a film in said guide and adapted for engagement by the film at said exposure aperture in the rearward position of said guide and mounted for movement rearwardly of said film engaging position, means for releasably positioning said film engaging member in its film engaging position, and at least one forwardly projecting stationary pilot pin on said film engaging member engageable with perforations of the film in alternation with said feed pin as the film is intermittently fed.

5. In a device of the character described the combination of a frame member provided with an opening, a film guide associated with said opening and disposed correspondingly with the plane thereof and having its front face portion provided with an exposure opening, means on said frame member for carrying said guide for facewise movement, and means for intermittently feeding a perforated film in said guide including a feed shuttle extending across said frame opening in front of said guide and mounted on said frame on opposite sides of said opening for reciprocating movement and means for facewise reciprocating said guide in timed relation with reciprocation of said shuttle.

6. In a device of the character described the combination of a frame member provided with an opening, a film guide associated with said opening and disposed correspondingly with the plane thereof and having its front face portion provided with an exposure opening, means on said frame member and associated with said opening for carrying said guide for facewise movement including an arm pivoted on said frame on an axis transverse to the guide and extending correspondingly with the plane thereof, a feed shuttle extending across said frame opening in front of said guide and mounted on said frame on opposite sides of said opening for reciprocating movement, two coaxial angularly fixed revoluble cams at one side of said guide, means for reciprocating said shuttle from one of said cams, and a cam follower on said arm and engaged with the other of said cams for facewise reciprocating said guide.

7. In a device of the character described the combination of a frame member provided with an opening, a film guide associated with said opening and disposed correspondingly with the plane thereof and having its front face portion provided with an exposure opening, two rocker levers pivotally mounted on said frame member in said opening with their axes at a right angle and extending correspondingly with the guide, each rocker lever comprising a pair of spaced correspondingly extending arms extending adjacent opposite edges of the guide and pivotally connected therewith on a common axis for facewise movement of the guide, a feed shuttle extending across said frame opening in front of said guide and mounted on said frame on opposite sides of said opening for reciprocating movement, two coaxial angularly fixed revoluble cams disposed at one side of said guide on an axis normal to the plane thereof and comprising a radial cam and an axial cam, a pivoted lever engaged with said radial cam and having a sliding and pivotal operative connection with said shuttle for reciprocating the same, and a cam follower on an arm of one of said rock levers and engaged with said axial cam for facewise reciprocating said guide in timed relation with reciprocation of said shuttle.

8. In a device of the character described the combination of a film feed guide, of two pivotally mounted rocker levers disposed with their pivotal axes at a right angle and extending correspondingly with the plane of the guide, and each rocker lever comprising a pair of spaced correspondingly extending arms extending adjacent opposite edges of the guide and pivotally connected therewith on a common axis for facewise movement of the guide.

9. In a device of the character described the combination of a film guide, of two pivotally mounted rocker levers disposed with their pivotal axes at a right angle and extending correspondingly with the plane of the guide, each rocker lever comprising a pair of spaced correspondingly extending arms extending adjacent opposite edges of the guide and pivotally connected therewith on a common axis for facewise movement of the guide, a revoluble cam at one side of the guide, and a cam follower on the adjacent rock lever arm and engaged with said cam.

ALBERT S. HOWELL.